United States Patent
King

(10) Patent No.: US 8,720,655 B2
(45) Date of Patent: May 13, 2014

(54) LUGGAGE CASE WITH LARGE FOLDING WHEELS

(75) Inventor: William L. King, Swansea, MA (US)

(73) Assignee: Samsonite IP Holdings S.a.r.l., Luxembourg (LU)

(*) Notice: Subject to any disclaimer, the term of this patent is extended or adjusted under 35 U.S.C. 154(b) by 483 days.

(21) Appl. No.: 12/954,339

(22) Filed: Nov. 24, 2010

(65) Prior Publication Data

US 2011/0120828 A1 May 26, 2011

Related U.S. Application Data

(60) Provisional application No. 61/264,157, filed on Nov. 24, 2009, provisional application No. 61/303,183, filed on Feb. 10, 2010.

(51) Int. Cl.
*B62D 5/14* (2006.01)
*A45C 5/14* (2006.01)
*B62B 1/12* (2006.01)

(52) U.S. Cl.
CPC .... *A45C 5/14* (2013.01); *B62B 1/12* (2013.01)
USPC ............... 190/18 A; 280/652; 280/47.26

(58) Field of Classification Search
USPC ........ 190/18 A; 180/9.26; 280/205, 401, 630, 280/491.1, 47.18, 652, 47.26
See application file for complete search history.

(56) References Cited

U.S. PATENT DOCUMENTS

| | | | |
|---|---|---|---|
| 284,825 A * | 9/1883 | Deimel | 190/20 |
| 3,805,929 A | 4/1974 | Kuwayama | |
| 4,160,495 A | 7/1979 | Conard | |
| D259,232 S * | 5/1981 | Tarozzi | D7/313 |
| 4,411,343 A | 10/1983 | Cassimally et al. | |
| 4,759,431 A | 7/1988 | King et al. | |
| 5,285,656 A * | 2/1994 | Peters | 62/457.1 |
| 5,908,093 A | 6/1999 | Miyoshi | |
| 5,943,936 A | 8/1999 | Deliman et al. | |
| 5,964,470 A | 10/1999 | Syendsen et al. | |
| 6,032,771 A | 3/2000 | Pedrini | |
| 6,076,641 A | 6/2000 | Kinzer et al. | |
| 6,279,706 B1 | 8/2001 | Mao | |
| 7,322,452 B2 | 1/2008 | Nykoluk | |
| 7,347,430 B2 * | 3/2008 | Jenkins | 280/47.26 |
| 7,992,881 B2 * | 8/2011 | Edelblut | 280/47.19 |
| 2002/0095947 A1 * | 7/2002 | Treppedi et al. | 62/457.9 |
| 2004/0050637 A1 | 3/2004 | Scott | |
| 2004/0069789 A1 * | 4/2004 | Ohno et al. | 220/592.2 |

FOREIGN PATENT DOCUMENTS

| | | |
|---|---|---|
| DE | 102009010071 | 8/2010 |
| FR | 2668341 | 4/1992 |
| JP | 4276209 | 10/1992 |
| WO | WO 80/01639 | 8/1980 |
| WO | WO 84/03821 | 10/1984 |

* cited by examiner

*Primary Examiner* — Tri Mai
(74) *Attorney, Agent, or Firm* — Dorsey & Whitney LLP

(57) ABSTRACT

A wheeled luggage case may include first and second shells connected together at their perimeter edges to define a generally parallelepiped packing volume. A wheel device may be attached to each of the first and second shells. Each of these wheel devices may include a hub rotatably attached to a respective shell. A tire may be attached to the hub for rolling on the supporting surface when the tire portion and hub are rotated about this axis of rotation. The tire portion may include a series of tire segments. At least some of the segments may be attached to the hub portion by a hinge. The hinge may include a hinging axis of rotation at a substantially right angle to the axis of rotation of the hub itself.

12 Claims, 7 Drawing Sheets

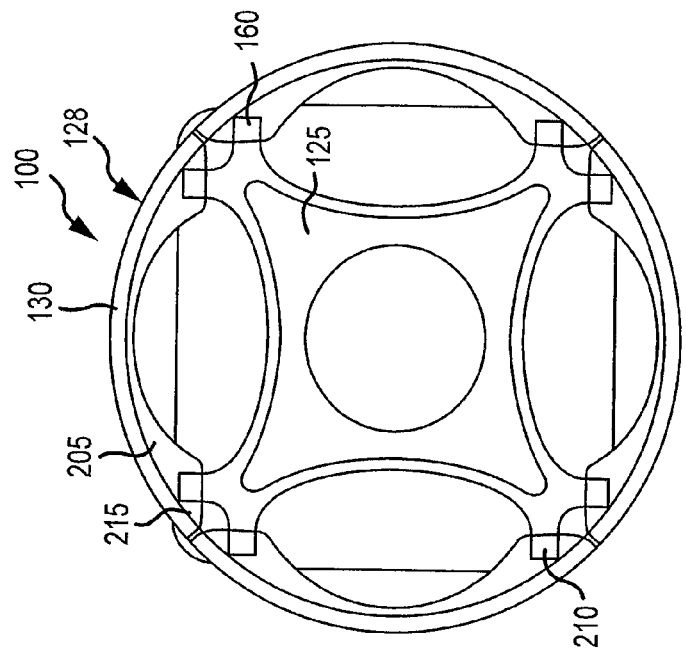
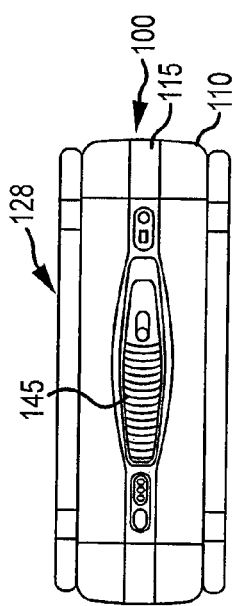
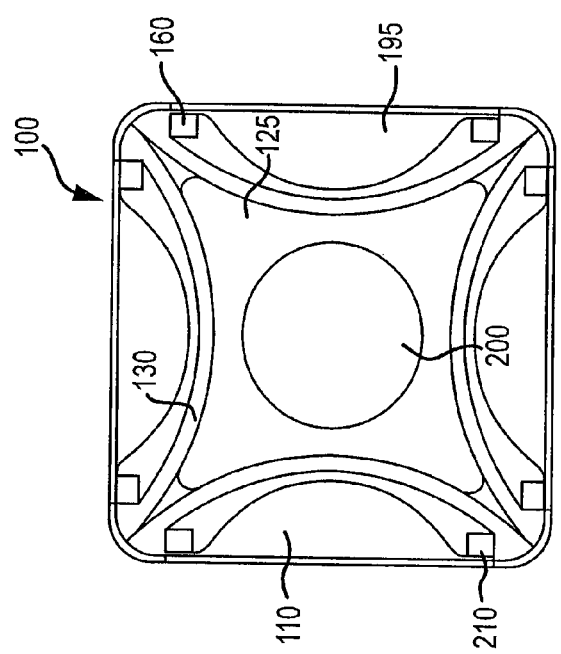

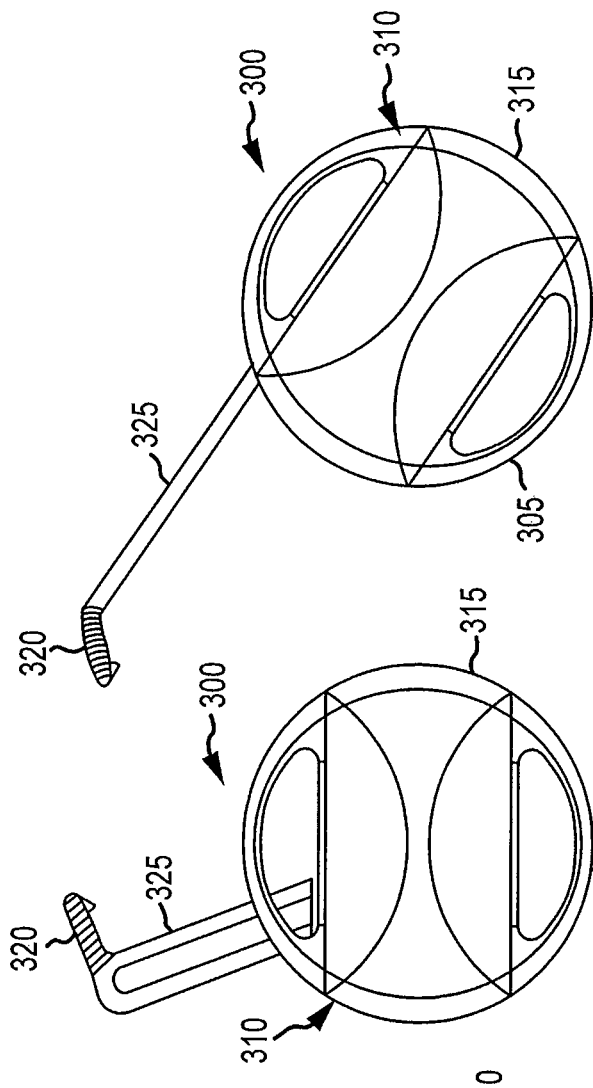

US 8,720,655 B2

LUGGAGE CASE WITH LARGE FOLDING WHEELS

CROSS-REFERENCE TO RELATED APPLICATIONS

This application claims of the benefit, under 35 U.S.C. §119(e), to U.S. Provisional Application No. 61/264,157, entitled "Luggage Case with Large Folding Wheels" and filed on Nov. 24, 2009, and U.S. Provisional Application No. 61/303,183, entitled "Luggage Case with Large Folding Wheels" and filed on Feb. 10, 2010, which are hereby incorporated by reference herein in their entireties.

BACKGROUND

Wheels are often provided on luggage cases. Such wheels usually consist of two and sometimes four wheels affixed near the lowermost corners of the luggage case. While it can be desirable to provide fairly large diameter wheels to reduce or minimize the traveler's efforts to push or pull the wheeled luggage case across the ground, up stairs or over curbs, wheels on a luggage case are typically relatively small compared to the size of the case.

SUMMARY

A piece of luggage may include a luggage case and at least one wheel. The luggage case may include a main body. The at least one wheel may be rotatively joined to at least one major surface of the luggage case. The at least one wheel may have an axis of rotation. The at least one wheel may include at least one arc segment that folds relative to a circumference of the wheel along a line perpendicular to the axis of rotation of the wheel, thereby allowing a user to selectively fold the at least one arc segment into a storage position along a side of the main body.

BRIEF DESCRIPTION OF THE FIGURES

FIG. 8 shows a top plan view of a second embodiment of a luggage case with wheels.

FIG. 9 shows a side elevation view of the luggage case shown in FIG. 8, showing the wheel in a stored configuration.

FIG. 10 is a view similar to FIG. 9, showing in the wheel in a operational configuration.

FIG. 11a shows a top plan view of a third embodiment of a luggage case with wheels.

FIG. 11b shows a side elevation view of the luggage case of FIG. 11a.

FIG. 11c shows a side elevation view of a fourth embodiment of a luggage case with wheels.

FIG. 12b shows a bottom plan view of the luggage case shown in FIG. 12a.

FIG. 13b is a another bottom plan view of the luggage case of FIG. 12a, showing the wheels in a stored configuration.

DETAILED DESCRIPTION

Figure 1:
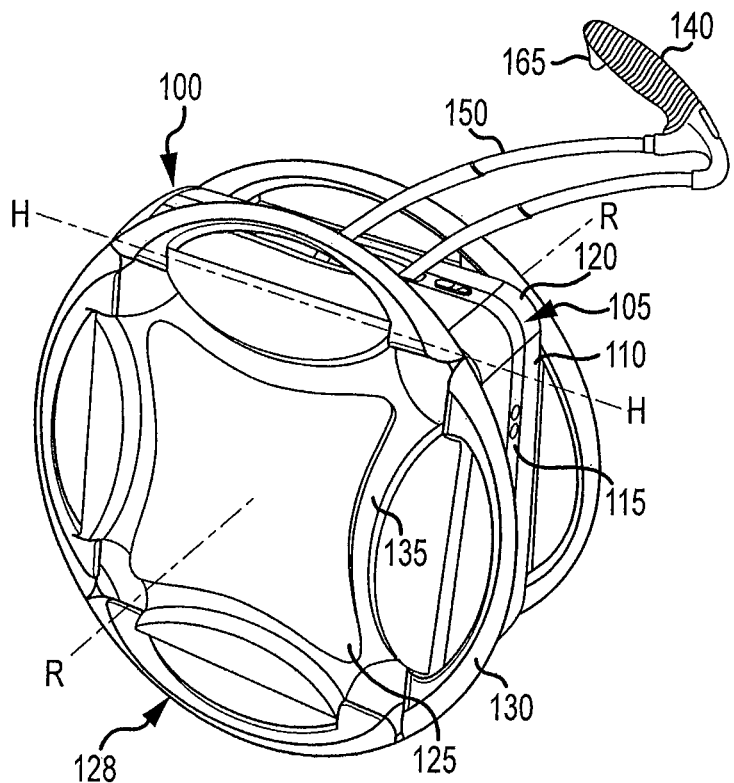
FIG. 1 shows a perspective view of a first embodiment of a luggage case with wheels.

Described herein are wheeled luggage cases. The wheeled luggage cases may include first and second shells connected together at their perimeter edges to define a generally parallelepiped packing volume. A wheel device may be attached to each of the first and second shells whereby the wheel device can roll on a supporting surface such as a floor or stairs to help transport the luggage case thereover. Each of the wheel devices may include a hub portion rotatably attached to a respective shell. The hub portion has an axis of rotation. A tire portion may be attached to the hub portion for rolling on the supporting surface when the tire portion and hub are rotated about this axis of rotation. The tire portion may include a series of tire segments. At least some of tire segments may be attached to the hub portion by a hinge. The hinge may include a hinging axis of rotation at a substantially right angle to the axis of rotation of the hub itself.

The hub may include a generally rectangular, flat molded polymer structure. The corners and sides of this molded hub may include portions of the hinges used to attach the hinged tire segments to the hub. The hub itself may include a relatively smooth outer surface and an axle, or other attaching mechanism, on the opposite side for mounting it to the broad face or side of its respective shell.

The tire portion may include one or more tire segments, each mounted at, or along a side of, the hub. The tire segments may include a ground engaging portion. The tire segments may be formed from an injection molded thermoplastic elastomer, a lightweight foamed polyurethane composition, or any other suitable material. The ground engaging portion may take the form of an arc segment of a circle and may have a high friction outer surface for engaging the edges of steps, curbs or sloping ground. Each hinging tire segment may include a pair of hinge knuckles, with one hinge knuckle of the pair located just radially inward of each end of its arc shaped ground engaging portion. An axle or pintle (not shown) may project from each knuckle. The axle or pintle may be received in a corresponding knuckle formed at the outermost corner of the hub.

The hinging knuckles on each hinged tire portion may be spring loaded with a torsional spring or the like that biases each tire segment for rotational motion about a hinging axis H into its deployed or operational position, so that when each of the hinged segments are fully deployed by the spring biased hinges, they define a continuous circular tire surface. The circular tire surface supports the luggage case off the ground and rotatably engages the ground when the luggage case is towed or pushed. The hub may include molded-in grooves that correspond to the arc shape of each hinging tire segment.

The hub may include a detent for holding the tire segment in this groove against the spring bias of the torsional springs at the hinge knuckles. When so latched or detented, each tire segment is thus retained in a compact or storage position.

Each of the case shells may include a broad surface (e.g., a front, rear, right or left surface) with sides that extend between this broad surface and a perimeter edge of the surface. The broad surface may generally be square or rectangular in shape. The upstanding sides may taper from a broad base at the bottom end portion of the luggage case to a relatively narrow portion at the top end portion of the luggage case (i.e., the luggage case may include a depth that is greater at a bottom end portion of the luggage case than at the top end portion of the luggage case). The connection between the perimeter edges of the shells may include a frame affixed to one of the shells with rivets, staples or the like. The frame may include a hinge connection that connects one edge of the perimeter edge of a shell to a corresponding edge of the other shell along the broad base. The frame also may include locks or latches mounted along the opposite side of the hinge connection for selective hinging access to the packing volume inside the joined shells. The sides or frame may include other features as will be detailed below.

If the overall plan shape of the luggage case is square, there may be four hinging tire segments on each side of the case, such that each segment can hinge inwardly and thus be stored against the outer surface of the hub when the wheels are not in use. Where the overall plan shape is rectangular with long and short sides, each tire may include only two hinging tire segments, specifically those tire segments whose hinge knuckles are spaced from one another approximately the dimension of the two long sides of the luggage case. These two tire segments may be selectively pivoted to be position within the profile of the luggage case. The two other segments may not be so hinged, since their shorter outer tire segments may protrude a short distance beyond the short sides of the case. Alternatively for such rectangular shaped cases, the ends and upstanding walls of the case shells can curve outwardly to mimic the curves of the non-hinging segments when the hinging segments are in their stored positions, resulting in a packing compartment that takes full advantage of the space between the partially stored wheels. Also disclosed are external large diameter wheels for a luggage case with each wheel including only one folding section to facilitate storage along either the bottom surface or the major face of the luggage case.

Referring to the figures, a luggage case 100 may include a main body 105 defined by a pair of injection molded or vacuum formed luggage shells 110 of conventional construction. Each of the shells 110 may be attached together at their perimeter edges either by an integrally formed frame, by a separately molded or formed frame, by a zipper system or by any other suitable luggage shell joining method or system. A separately formed frame 115 may be utilized to support and mount certain features as detailed below. The shells 110 may include reinforced corner portions 120 that extend from the front to rear sides of the luggage case 100 along corner edges of the luggage case 100.

A hub 125 may be joined to each of the front and rear sides of the luggage case 100. Each hub 125 may include a geometric shape that matches the shape of its corresponding side. In some embodiments, the hubs 125 may be generally square as shown in FIG. 1 to correspond to the generally square shaped front and rear sides of the luggage case 100. In other embodiments, the hubs 125 may be generally rectangular as shown in FIG. 11b to correspond to the generally rectangular shape of the front and rear sides of the luggage 100. In any such embodiments, the hubs 125 may be generally sized to substantially cover the respective front and rear sides of the luggage case 100.

Four tire segments 130 may be mounted to each side of each hub 125. Each tire segment 130 may be joined by a hinged connection to its respective hub 125. This hinged connection allows the tire segments 130 to be selectively moved between a stored position within the profile of the hub 125 to a deployed or operational position. In the deployed or operational position, the tire segments 130 associated with a hub 125 define an overall large diameter wheel 128. In some embodiments, the diameter of the wheel 128 is larger than the height or length dimension of the luggage shell 110 and approximates the diagonal dimension of the luggage shell 110.

Figure 2:
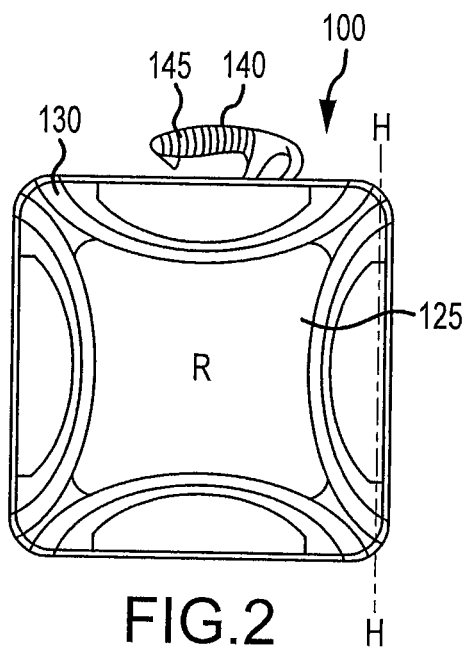
FIG. 2 shows an elevation view of the luggage case shown in FIG. 1, showing the wheels configured in a stored position.

The hingedly attached tire segments 130 may be positioned in the storage or compact position as shown in FIG. 2. In this position, the relatively thin tire segments 130 fit snugly into arc shaped indentations 135 in the relatively flat, thin and light hub 125. The hub 125 may be made by vacuum forming and punching an ABS plastic sheet or the like. When so folded and latched, the tire segments 130 present a striking sculptured appearance, but otherwise their functional nature is hidden.

The upper portion of the frame 115 may include a carry handle 140. The carry handle 140 may function as an extendable handle for guiding and towing the luggage case on its wheels 128. The grip 145 for the handle 140 may be located over the center of gravity of the luggage case 100. However, when the traveler desires to use the deployable tire segments 130 to aid in transporting the case over the ground or upstairs, a push button or trigger mechanism of known design (not shown) may be used to release curving, telescoping rods 150 joined to the carry handle 140. Release of the curving, telescoping rods 150 position the grip 145 upwardly and outwardly a substantial distance from the luggage case 100 to place the grip 140 at a convenient height for the traveler to walk and tow or push the luggage case 100.

Figure 3:
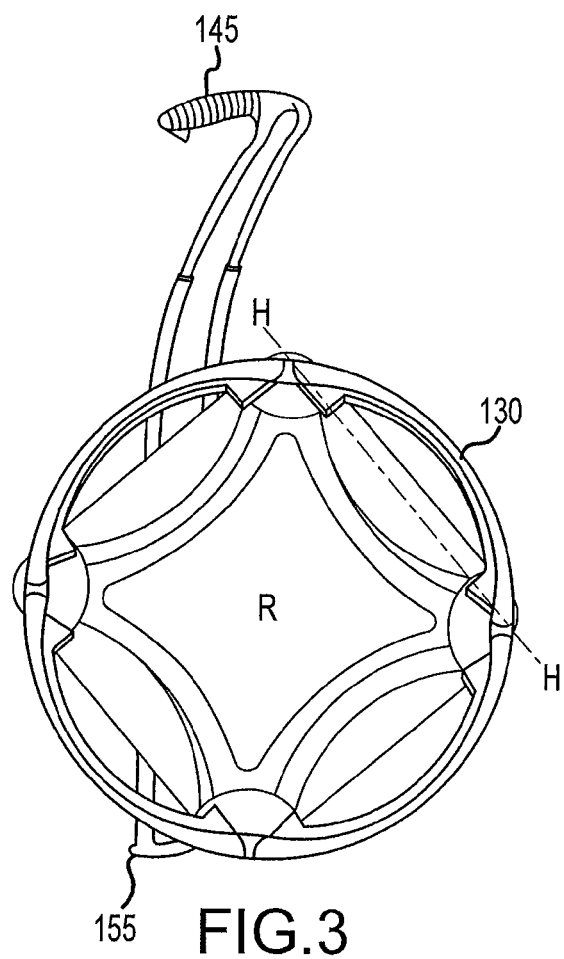
FIG. 3 shows an elevation view of the luggage case of FIG. 1, showing a strut holding the luggage case in a rest position.
Figure 4:
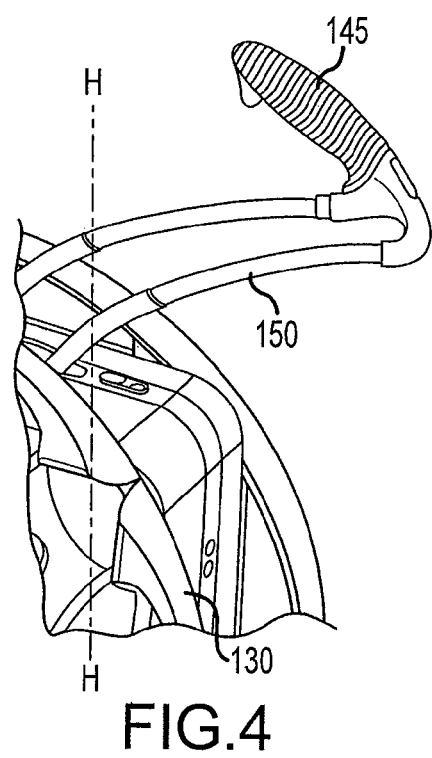
FIG. 4 is a partial perspective view of the luggage case of FIG. 1, showing a telescoping handle in its extended or deployed position.

A stand or strut 155 may be stored in a small cavity at one of the vertically extending portions of the frame 115. The stand or strut 155 may be rotated out of its stored position to support the luggage case 100 on its wheels 128 when the case 100 is rotated back by the extended grip 145 as shown in FIG. 3. The strut 155 may be counterbalanced so that when the case is rotated forward into its transport position, the strut 155 swings back into its stored position.

The hub 125 may present an overall square shape. In an alternative embodiment shown in FIGS. 8 through 10, the hub 125 may include an overall cruciform shape to reduce its mass and thus overall weight of the luggage case 100. Generally the hub 125 may include either a centrally mounted axle (not shown in the embodiment of FIGS. 1 through 6) or a circular bearing race of substantial diameter, as in the case of the embodiment shown in FIGS. 8 through 10. This axle or bearing race defines an axis of rotation "R". Thus the hub 125 together with its tire segments 130 rotate about this axis R when the tire segments 130 are in the deployed or operational position as shown in FIGS. 1, 3, 5, 6 and 10 for example.

At each corner of the hub 125, a pair of hinge knuckles may be mounted at right angles to one another. Each one of these hinge knuckles may be used to support an adjacent end of the associated tire segment 130. Inboard of these corners, an arc-like groove or cavity sized may receive the tire segment 130 when the tire segment is configured in its compact or stored position. Each tire segment 130 may be selectively moved from its operational to storage position, and vice versa, by rotating the tire segment 130 about a respective hinging axis H. The hinging mechanism may contained within the smoothly contoured end portions of the tire segments and the corner portions of the hub for the embodiment shown in FIGS. 1 through 6. In the embodiments of FIGS. 8 through 10 the hinge mechanisms 160 are more easily seen.

With the wheels 128 rotatably mounted on each of the oppositely facing front and rear surfaces of the luggage case 100, the luggage case 100 may be rolled over a horizontal surface or up stairs. A larger diameter wheel, all other things being equal, generally has a lower rolling resistance over pedestrian paths than a small diameter wheel. Thus the disclosed luggage presents a relatively large wheel diameter for a luggage case, and stands in marked contrast with the usual wheel luggage transport system that comprises relatively small wheels mounted along one or two edges of the luggage case.

To operate the disclosed wheel system, the traveler needs a way to guide the wheel system. The carry handle grip 145 may be mounted on one or more telescoping rods 150 that extend into a cassette (not shown) mounted on the inside perimeter of the luggage case frame 115. The grip 145 may extend a substantial distance away from the upper side of the luggage case to place the grip 145 at a convenient height for the traveler.

The grip and telescoping rod system may include additional mechanisms to control the rolling of the luggage case 100. A detent linked to the interior of the case by a cable system or the like may operate a pawl and tooth ratchet (not shown) mounted on the inside of the hub 125. This ratchet may function as a one way brake to prevent the luggage case 100 from rolling backwards when, for example, the luggage case 100 is pulled up a flight of stairs. Similarly, a trigger 165 may be mounted on the pistol end of the grip 145 and operate similar to the hand brakes of a bicycle so that the traveler can walk down the stairs with the wheeled luggage case 100 in the lead. The traveler can apply a braking force to the wheels 128 to slow the smooth rolling luggage case 100 down the stairs.

The reinforced corner portions 120 may project slightly beyond the upper reach of the wheels 128 even when the tire segments 130 are fully deployed. This is because the axis of rotation for each wheel 128 may be slightly below the exact geometric center of the generally square luggage case shells 110. This positions the lower corners within the wheel radius, thus protecting the lower corner portions from most contact with the floor. This slightly lower mounting position is especially desirable to accommodate taller and shorter travelers, who may tend to tilt the case back (in the case of the taller traveler) or forward (in the case of a shorter traveler). Alternatively, the axes R may be located slightly above the geometric center of the case 100. Thus the reinforced corners 120 may protrude slightly beyond the outer diameter of the wheels 128. This would lower the center of gravity further, leading to superior stability. If the telescoping rods 150 were made to permit precise length adjustment, these protruding reinforced corners would generally not interfere with rolling transport.

Figure 5:
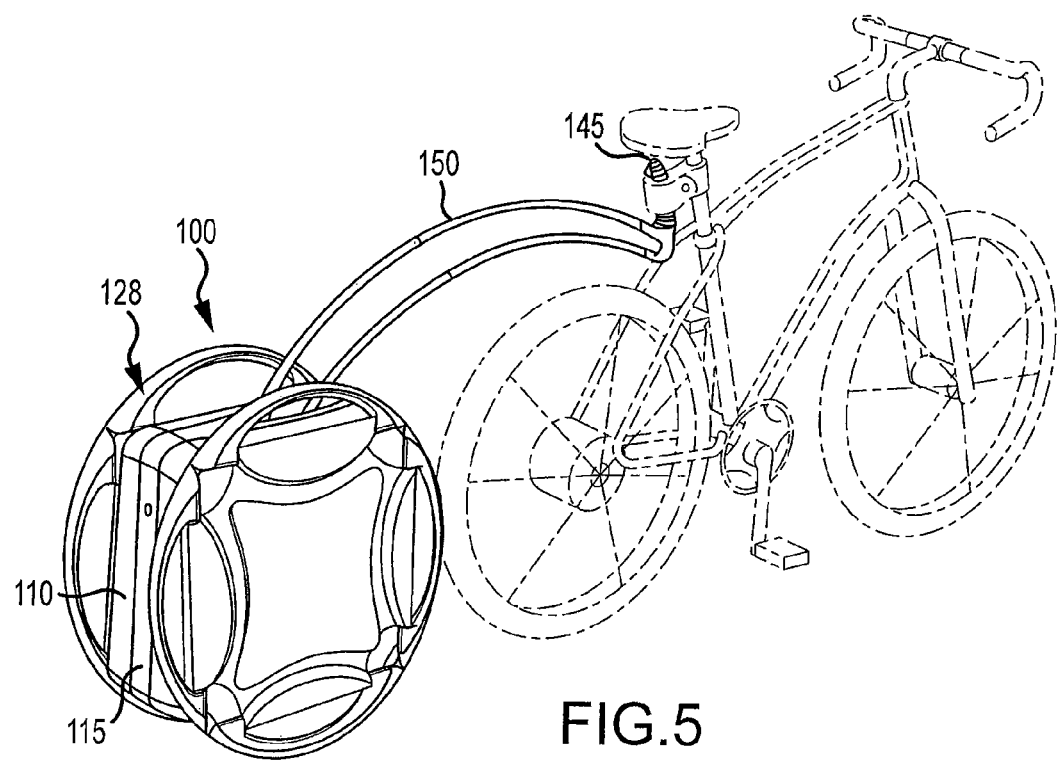
FIG. 5 shows a perspective view of the luggage case of FIG. 1, showing the luggage case joined a bicycle.
Figure 6:
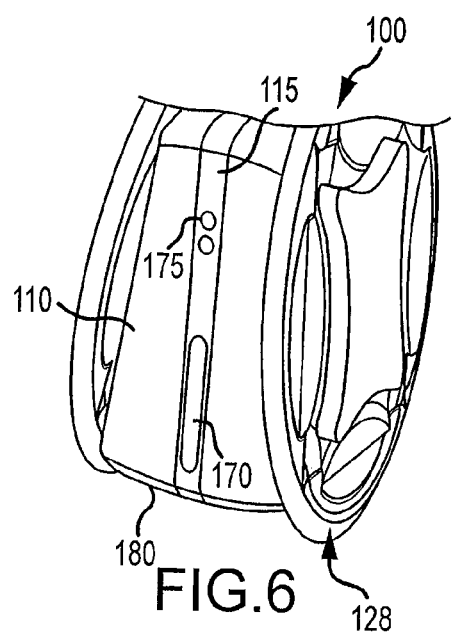
FIG. 6 shows a partial perspective view of the luggage case of FIG. 1.
Figure 7:
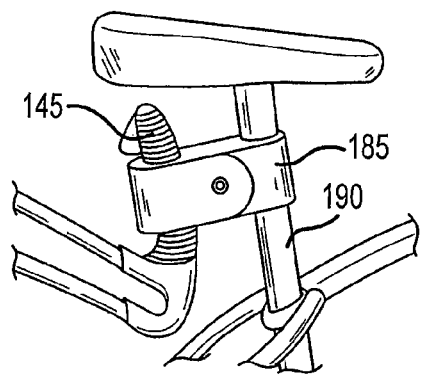
FIG. 7 shows a partial elevation view of the luggage case of FIG. 1, showing the attachment of the luggage case to the bicycle.

Turning to FIG. 5, the telescoping rods 150 may include a third telescoping stage to bring the handle grip 145 further forward to position in a generally vertically extending orientation (see FIG. 7). Thus, the luggage case 100 can be used as a "trailer" for cross-country bicycle trips and the like. The perimeter frame 115 that supports the two luggage shells 110 may include further support additional features, such as a reflector 170 and/or LED taillight 175 (FIG. 6).

Each tire segment 130 may be rotated about a respective hinging axis "H" that is generally perpendicular to the rotational axis "R" of the hub and tire combination. This does not necessarily mean that the axis of rotation is parallel to the ground or other supporting surface. It may be desirable to shape the luggage case 100 to have a broader base 180 that tapers to a smaller width at the top of the luggage case 100 to place the axes of rotation of the wheel devices at a slight camber angle. This is shown in FIG. 6. This camber angle may provide superior stability to the luggage case 100 when rolling on its large diameter wheels 128 by minimizing the risk of it tipping over too easily.

When mounted as a trailer on a bicycle, the ratchet detent and brake system may be deactivated. The grip 145 may be used join the luggage case 100 to the bicycle via a mounting clamp 185 (FIG. 7) joined to a seat post 190 of the bicycle. The mounting clamp 185 may be a tough elastic material, which both holds the grip 145 and seat post firmly yet permits the bicycle and the trailing luggage case 100 to pivot both about the seat post axis as well as about an axis perpendicular thereto (through the flexing of the elastomeric mount). The mounting clamp 185 may be formed by injection molding or the like. The elastomeric construction for the mounting clamp 185 provides for controlled relative movement between the luggage case 100 and the bicycle so that the bicyclist can lean into turns while the trailing luggage case 100 remains generally on both wheels 128. The mounting clamp 185 may function as a shock absorber to reduce the vibration and transmission of road impacts to the luggage case 100 through the extended telescoping rods 150.

Despite the large size of the wheels 128 attached to the luggage shells 110, the wheels 128 may be quite light. In the embodiment of FIGS. 8 through 10, this is shown by way of shaping the hub 125 as an overall cruciform shape with much of the broad square surfaces shown in the previous embodiment eliminated while keeping the hub 125 structurally sound. With reference to FIG. 9, four large semicircular segments 195 and a large circular portion 200 of the luggage shell 110 are visible. Also the tire segment mass may be reduced considerably over the previous embodiment. For example, the support surface engaging surfaces of the tire segments 130 may be quite thin and narrow, much like the tires of a racing bicycle. The tire segments 130 may also be made of a urethane foam or the like. The support portion 205 of the tire segments 130 may also be reduced. The hinge mechanism 160, which attaches each end of the tire segments 130 to the respective corners of the hubs 125, may include a pair of hinge knuckles 215 embracing a central hinge knuckle 210 integrally formed on the corner of the hub 125. A large diameter bearing race permits the elimination of a disk-shaped portion of the hub 125, while providing a robust connection between the rotating hub 125 and the underlying luggage shell 110.

Referring now to FIGS. 11a-c, the luggage case 300 with wheels may be similar to previously described embodiments. However, the overall rectangular shape of the luggage case 300 differs from the square shape. This results in a shorter, squatter case shape with proportions more consistent with conventional luggage cases. That is, the height dimension of the case 300 when being carried by hand is less than the length dimension, with the width dimension (in the direction normal to the plane of FIG. 11a) less than both the length and the height dimension. Such a rectangular shape may permit this configuration to more easily meet the maximum dimensional restrictions for so called "carry-on" hand luggage for airline travel. Additionally, this rectangular execution may reduce to two the number of tire segments 305 mounted on hinges to form each wheel 310. With reference to FIG. 11a, each of the two hinged tire segments 305 fold towards one another to their stored positions within the profile of the overall rectangular shape of the case 300, much like the four hinge tire segments 130 detailed above do. However, the two shorter tire segments 315 on each side of the rectangular case 300 do not hinge and thus remain deployed in their rolling position. These shorter, fixed tire segments 315 nonetheless conform substantially to the rectangular shape of the case shells sandwiched between them, protruding at most only a few centimeters beyond the right and left walls of a case 300, especially when such cases are sized as carry-on luggage.

FIG. 11b shows a handle grip 320 mounted on extendable rods 325 in a manner similar to the previous embodiments. The details of such grip or wheel handle mechanisms are quite well known and will not be further detailed here. Such systems typically include a storage compartment or cassette for receiving the rods 325 and for holding an associated mechanical system FIG. 11c shows one or more straight rods 325 used to deploy the handle grip 320. The rod or rods 325 in this embodiment extend parallel to, and thus can be supported by and stored in, one of the longer side walls of the rectangular case shells and/or frame portions, thus simplifying their construction.

Figures 12A, 13A:
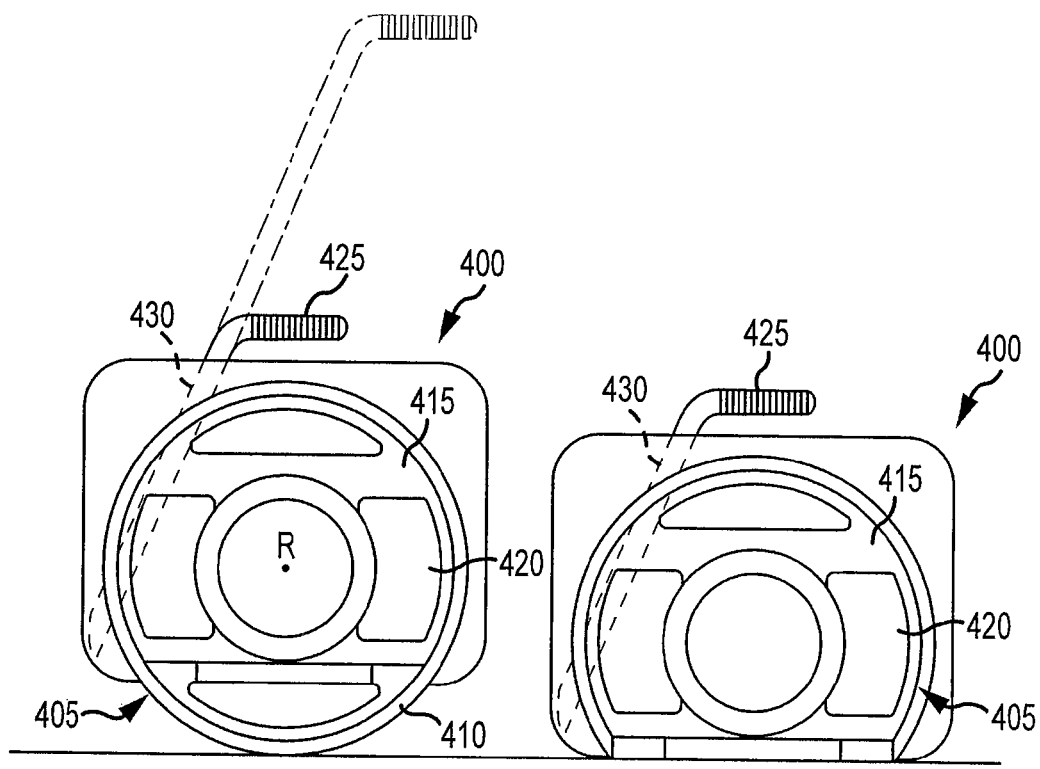
FIG. 12a shows a side elevation view of a fifth embodiment of a luggage case with wheels.
FIG. 13a shows another side elevation view of the luggage case shown in FIG. 12a, showing the wheels in a stored configuration.

An additional embodiment of the luggage case with folding wheels is shown in FIGS. 12a through 13b. As shown in FIG. 12a, a luggage case 400 may include construction details similar to the previously described execution is shown. Here, however, the wheel 405 on each side of the luggage case 400 may include only one folding tire segment 410. The hub 415 of the wheel 405 in this execution may be attached to the major face (e.g., the front and rear faces) of the luggage case 400 on either side, and rotate around a center of rotation R. As noted above, the hub 415 may be attached via an axle, or via a race structure. Here, a race structure is represented. The hub may, as here, have several cutout sections 420 in order to reduce its weight as noted above.

In the luggage case shown in FIG. 12a, only the lower portion of the wheel 405 that engages the ground may be foldable, with the rest of the perimeter of the wheel 405 generally within the perimeter of the luggage case, although this is not a requirement. The folding tire segment 410 of each of the wheels 405 may be connected to the rest of its respective wheel 405 and hub 415 by the knuckle pivoting structure described above. A hinge structure is formed along a fold line between the portion of the hub 415 and the ground engaging portion of the wheel 405 that fold together relative to the rest of the hub 415 and wheel 405. In this execution, the center of rotation R of the hub 415 with respect to the luggage case 400 may be positioned below the center of gravity of the shape of the luggage case 400, and act to lift the luggage case 400 off the ground when the wheels are deployed.

Also shown in FIG. 12a is an extendable and retractable handle 425. In the retracted position, the handle 425 may be positioned over the center of the luggage case 400, which makes it convenient for the user to either roll the luggage case 400 if the wheels 405 are deployed, or lift the luggage case 400 if the wheels 405 are not deployed, from a central location above the top of the luggage case 400. In an extended position, the handle 425 extends upwardly from the telescoping handle structure and may be positioned generally above and generally towards the rear end of the luggage case 400 (although this particular positioning is not required). In the extended position, the traveler may more easily guide the luggage case 400 from behind or pull the luggage case 400 from in front as is desired. The handle 425 may be a single pole handle or a dual pole handle. If it is a single pole handle, the handle 425 may be positioned through the center of the luggage case 400, or may be aligned with a side of the luggage case 400 to create less interference with the storage space inside the luggage case 400. If the handle 425 is a dual pole handle, each of the poles may be associated with the major faces of the luggage case 400 in order to reduce the amount of interference with the storage volume within the luggage case 400. The pole or poles 430 of the handle 425 may be curved or straight, and may have any of a variety of cross sectional shapes, such as oval, round, square, rectangle, other geometric or non-geometric shapes.

Figures 12B, 13B:
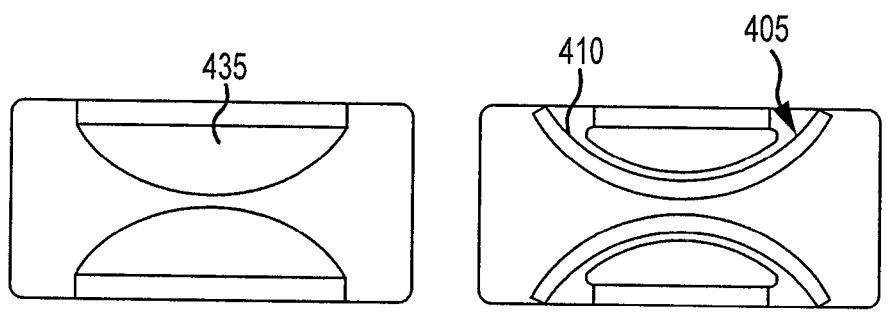

As shown in FIG. 12b, the bottom surface of the luggage case may include two recesses 435, one for each foldable section of the wheels 405. In FIG. 12b, the wheels are in their extended or operational position so only the ground engaging portion of the wheels 405 are seen. However, the recesses 435 are shown, and in this particular embodiment the recesses 435 are curved, to replicate the curved structure of the wheel section to be folded and fit into each recess 435. Each recess 435, as noted above, may include a detent in order to keep the folded sections of the wheels 405 in position when in a stored orientation. The shape of the recess 435 need not match the shape of the folded section of the wheels 405. There may also not be any recess 435, in which case the wheel segments fold against the bottom surface of the luggage case 400.

FIG. 13a shows the luggage case 400 of FIG. 12a with the wheel section for each wheel 405 folded and in the stored position. When the wheel sections are in the folded and stored configurations, the luggage case 400 rests on its bottom surface on the ground or other support surface. The folded wheel sections may provide a solid foundation to rest the luggage case 400 upon, to the extent the folded sections of the wheels 405 extend beyond the plane of the bottom surface of the luggage case 400. The knuckle structures may form protrusions in their folded position. As noted above, there may be a spring structure in the hinge structure to help bias the wheel sections into their extended position for operation as shown in FIGS. 12a and 12b. The detents formed in the recesses 435 on the bottom surface of the luggage case 400 help keep the folded sections of the wheels 405 in their folded positions.

The portion of the hub 415 which folds with the ground-engaging portion of the wheel 405 provides a support rim for the ground-engaging portion of the wheel 405 that is part of the folding section. The hinge that allows the folding section to fold relative to the balance of the hub 415 may be a piano hinge, a living hinge, a discreet or plurality of discreet hinges, or other structure suitable to offer this function.

Figure 14A:
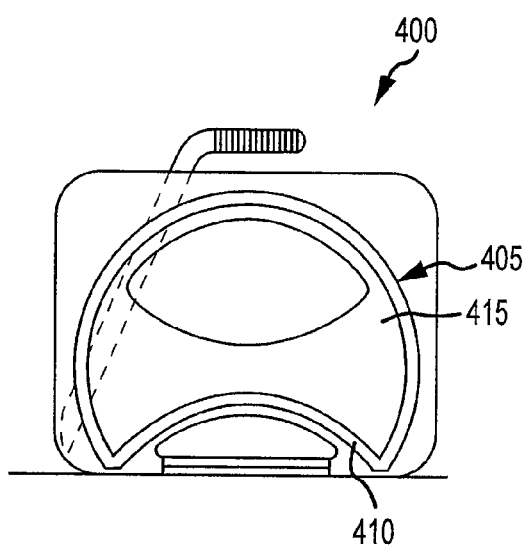
FIG. 14a shows a side elevation view of a sixth embodiment of a luggage case.
Figure 14B:
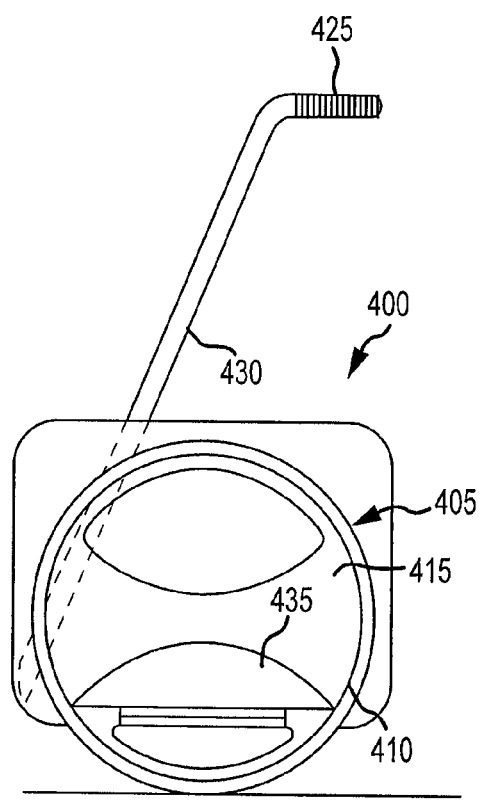
FIG. 14b shows another side elevation view the luggage case shown FIG. 14a, showing the wheels in an operational configuration.

Moving to FIGS. 14a and 14b, yet another example of a luggage case with wheels is shown. FIG. 14a shows an embodiment similar to that example shown in FIG. 12a. Again, this embodiment has construction details similar to the previously described executions. In this execution, the tire segment 410 that folds into the retracted position does not fold along the bottom side of the case as in FIGS. 12a and 13a, but instead folds upwardly into the major face of the luggage case 400 as shown in FIG. 14b. The folding hub structure as well as the ground engaging portion of the wheel 405 may be connected to the balance of the hub structure by the knuckle joints as described above, and instead of folding 90 degrees under the luggage case 400 to fit into recesses formed in the bottom side of the luggage case as shown in FIGS. 12b and 13b, folds approximately 180 degrees to be received in a recess 435 formed on the major face of the luggage case 400. The recess 435 may be formed in the hub 415 of the wheel 405 and not in the major face, but in any event, the folding section of the single folding segment wheel structure in FIG. 14a may fold into a general plane along the major face of the luggage case 400.

In FIG. 14a, given the storage space required for the wheel segment folding into the hub along the major face, this hub 415 is shown utilizing an axle structure, as opposed to a larger diameter race structure, for allowing the hub to rotate relative to the luggage case. In short, the single folding element of the wheel structure in the embodiment shown in FIGS. 14a and b folds along and stores along the major face of the luggage case. A hinge similar to that structure shown and utilized in FIGS. 12a through 13b is also utilized here to facilitate the rotation to the storage position, as well as rotation from the storage position to the operating position of the wheel segment. The handle 425 shown in FIGS. 14a and b is similar to that shown in FIGS. 12a and 13a.

The disclosed wheeled luggage systems provide many advantages over conventional luggage cases. The rolling resistance provided by the extremely large diameter wheels may reduce traveler fatigue and permit the traveler to not only go long distances over horizontal surfaces but also up and down stairs over curbs and over relatively rough terrain, carpeting, grass, etc. Furthermore, the wear and stress on the tire surfaces may be much reduced since the total distance traveled by each rotation of the extremely large tire segments per unit of distance traveled is reduced. The protruding small caster type wheels of conventional wheeled luggage must withstand tremendous forces and impacts during wheeling and as checked luggage. Here the tire segments are protected in their respective grooves within the hub, thus protecting these tires as well as the mechanical systems during shipping.

The axle or bearing race rotatably connecting the hub to the luggage case may be simply constructed of simple low tech materials because of the large diameter of the wheels. Similarly as discussed regarding wear and tear on the tire segments the relatively large size of the axle or bearing race on which the hubs are mounted can spread impact stresses and wear and tear resulting in an overall dependable robust system likely superior to prior wheel luggage systems.

What is claimed is:

1. A piece of luggage, comprising
a luggage case including a main body;
at least one wheel rotatively joined to at least one major surface of the luggage case and having an axis of rotation;
the at least one wheel includes at least one arc segment that folds relative to a circumference of the wheel along a line perpendicular to the axis of rotation of the wheel, thereby allowing a user to selectively fold the at least one arc segment into a storage position along a side of the main body;
wherein when each of the at least one arc segment is positioned into its respective storage position, a bottom surface of the luggage case rests on a support surface and the at one wheel has a non-circular shape; and
when each of the at least one arc segment is deployed from its respective storage position, the at least one arc segment forms a circular tire surface for the at least one wheel.

2. The luggage of claim 1, wherein the main body comprises two shells.

3. The luggage of claim 1, wherein the side comprises a bottom side of the luggage.

4. The luggage of claim 1, further comprising a telescoping handle operatively joined to the main body.

5. The luggage of claim 1, wherein the at least one wheel includes a diameter that is at least as great as at least one of a length or a height of the main body of the luggage case.

6. The luggage of claim 1, wherein the at least one wheel includes a hub, and at the least one arc segment is hingedly joined to the hub by at least one knuckle.

7. The luggage of claim 1, further comprising a strut operatively joined to the main body of the luggage case and configured for selective movement between a deployed position and a stored position.

8. The luggage of claim 1, wherein the main body includes a first side, a second side substantially parallel to and spaced apart from the first side, and at least one reinforced corner that extends from the first side to the second side.

9. The luggage of claim 1, wherein a bottom end portion of the luggage case has a width that is greater than a top end portion of the luggage case.

10. The luggage of claim 1, wherein the axis of rotation is substantially parallel to a support surface.

11. The luggage of claim 1, wherein the axis of rotation extends at a slight camber relative to a surface of the main body.

12. The luggage of claim 1, wherein the at least one wheel includes a hub, and the hub comprises at least one an arc shaped indentation that receives a corresponding arc segment of the at least one arc segment when said corresponding arc segment is positioned in the storage position.

\* \* \* \* \*